(12) United States Patent
Vieira (10) Patent No.: US 12,050,354 B2
(45) Date of Patent: Jul. 30, 2024

(54) OPTICAL BRANCHING AND TERMINATION BOX

(71) Applicant: FURUKAWA ELECTRIC LATAM S.A., Paraná (BR)

(72) Inventor: Thiago Deconto Vieira, Curitiba (BR)

(73) Assignee: Furukawa Electric Latam S.A., Curitiba (BR)

( * ) Notice: Subject to any disclaimer, the term of this patent is extended or adjusted under 35 U.S.C. 154(b) by 277 days.

(21) Appl. No.: 17/626,390

(22) PCT Filed: Jul. 8, 2020

(86) PCT No.: PCT/BR2020/050251
§ 371 (c)(1),
(2) Date: Jan. 11, 2022

(87) PCT Pub. No.: WO2021/003544
PCT Pub. Date: Jan. 14, 2021

(65) Prior Publication Data
US 2022/0269025 A1    Aug. 25, 2022

(30) Foreign Application Priority Data
Jul. 11, 2019 (BR) ................ 10 2019 014363 0

(51) Int. Cl.
*G02B 6/44* (2006.01)
(52) U.S. Cl.
CPC ....... *G02B 6/4441* (2013.01); *G02B 6/44465* (2023.05); *G02B 6/4454* (2013.01); *G02B 6/4471* (2013.01); *G02B 6/445* (2013.01); *G02B 6/44528* (2023.05); *G02B 6/44785* (2023.05)

(58) Field of Classification Search
CPC ... G02B 6/445; G02B 6/44465; G02B 6/4447
See application file for complete search history.

(56) References Cited

U.S. PATENT DOCUMENTS 6,226,434 B1    5/2001 Koshiyama et al.
6,661,961 B1 *  12/2003 Allen ............... G02B 6/445
                                                  385/135
7,970,249 B2    6/2011 Solheid et al.
(Continued)

FOREIGN PATENT DOCUMENTS

JP    6021364 B2    11/2016
WO   2016205340 A1  12/2016
(Continued)

*Primary Examiner* — Michelle R Connelly
(74) *Attorney, Agent, or Firm* — Hahn Loeser & Parks LLP; Bret A. Hrivnak (57) ABSTRACT

The box comprises a base (10) hinging a lid (20) and a tray (40) carrying fiber splicing and splitting means (AF, EF) and output adapters (AS). A side opening (13) of the base (10) is closed by a sealing bung (30) and the tray (40) incorporates, on a front face (42), a lateral anchoring element (45) provided with anchoring cutouts (45b) and being seated on the sealing bung (30). The side anchoring element (45) receives a sealing element (50) with forward slots (51) to receive a terminal cable (CT). The lid (20) has a back edge (22a) with an extension seated against the sealing element (50) and with another extension forcing a terminal cable (CT) into an anchoring cutout (45b).

12 Claims, 9 Drawing Sheets

(56) References Cited

U.S. PATENT DOCUMENTS

| | | | |
|---|---|---|---|
| 8,111,966 B2 | 2/2012 | Holmberg et al. | |
| 9,140,870 B2 | 9/2015 | Marmon et al. | |
| 9,188,760 B2 | 11/2015 | Kowalczyk et al. | |
| 9,310,579 B2 | 4/2016 | Massuda | |
| 9,377,132 B2 | 6/2016 | Bishop et al. | |
| 9,575,279 B1 | 2/2017 | Yoshizawa | |
| 9,952,397 B2* | 4/2018 | Hanson | G02B 6/4448 |
| 10,001,617 B2* | 6/2018 | Clatanoff | G02B 6/445 |
| 10,809,478 B2* | 10/2020 | Sadasivan | G02B 6/445 |
| 11,428,887 B2* | 8/2022 | Liefsoens | G02B 6/4248 |
| 11,579,392 B2* | 2/2023 | Diepstraten | G02B 6/389 |
| 2006/0153516 A1* | 7/2006 | Napiorkowski | H04Q 1/028 |
| | | | 385/134 |
| 2007/0272440 A1* | 11/2007 | Grunwald | H01R 9/2425 |
| | | | 361/752 |
| 2009/0202214 A1* | 8/2009 | Holmberg | G02B 6/4446 |
| | | | 385/136 |
| 2009/0252472 A1* | 10/2009 | Solheid | G02B 6/4454 |
| | | | 385/135 |
| 2014/0023334 A1* | 1/2014 | Larsson | G02B 6/445 |
| | | | 385/135 |
| 2016/0252694 A1* | 9/2016 | Sadasivan | G02B 6/445 |
| | | | 385/135 |
| 2018/0095232 A1* | 4/2018 | Feng | G02B 6/4452 |
| 2018/0120527 A1* | 5/2018 | Carapella | G02B 6/4457 |
| 2018/0331761 A1* | 11/2018 | Hubbard | G02B 6/4457 |
| 2021/0011239 A1* | 1/2021 | Geens | G02B 6/44515 |
| 2023/0050734 A1* | 2/2023 | Geens | G02B 6/3897 |

FOREIGN PATENT DOCUMENTS

| | | | |
|---|---|---|---|
| WO | 2017162751 | A1 | 9/2017 |
| WO | 2020178664 | A1 | 9/2020 |

\* cited by examiner

OPTICAL BRANCHING AND TERMINATION BOX

FIELD OF INVENTION

The present invention relates to an optical cable termination and drop (splitter) box, to be applied to aerial fiber optic networks called FTTH ("fiber to the home"), to protect an optical splice ("splitter") between an optical fiber of a multi-fiber distribution cable received in the box and multiple optical terminal cables ("drop" cables), usually in the form of compact ("low friction") cables, and/or optical splices by fusion between one or more optical fibers of the distribution cable and a respective drop optical cable (continuation multifiber optical cable).

BACKGROUND OF THE INVENTION

Fiber optic networks require the provision of splicing points and termination points, user activation points, which are protected by termination and drop boxes, usually installed externally, overhead and fixed on the strand, on a pole or on the facade of a building.

In a splice point, for example, one or more fibers of a distribution cable, received in a termination/drop box, are fused to the respective fibers of a drop cable that leaves the box to reach a new splice point or a user activation endpoint.

However, at a user activation point, one of the fibers of the optical drop cable arriving at an aerial termination box is submitted to a splitter to provide terminal cables directed to end users of the network. The fibers of the drop optical cable that arrive at a termination box but are not connected to a respective terminal cable ("drop" cable) can pass through the box unmodified, or be spliced to a new continuation cable length to proceed to a new splice point or user activation point.

These termination boxes must be constructed to accommodate at least one multifiber distribution cable, and to allow the exit of one or more drop cables and a plurality of compact "drop" cables, requiring internal accommodation for splitter splices and drop cables.

A problem with these boxes is the risk of damage to the compact terminating cables already installed in them during optical network maintenance operations, when the installer needs to move the internal fiber accommodation elements in the box, often causing undue bending of the terminating compact optical cables and even damaging the connection adapters of these terminating cables, which need to be disconnected from the adapters so that the installer has access to the fiber fusion areas.

To reduce these risks, termination boxes have been proposed with the internal elements for accommodation of the compact terminal cables physically separated from the internal elements for accommodation of the multifiber drop cables, considering that the installers of multifiber drop cables are responsible for the fiber fusion operations, while the installers of compact terminal cables are responsible for the operations of connection of these cables to the respective adapters provided inside the box and connected to the splitter.

With the physical separation of the referred accommodation elements, each installer has his respective work area separated from the other's work area, reducing the possibility of a team damaging the other's work.

Despite minimizing the aforementioned risks of damage and reducing the number of costly calls/attendances for maintenance of the multifiber drop cable network or compact terminal cables, this well-known solution of physical separation of the cable accommodation elements is complex and costly.

Yet another deficiency of the known termination and drop boxes is related to the sealing solutions employed in them, which have their degree of tightness high in conjunction with their constructive complexity and consequent production costs. In some solutions, the constructive simplification leads to deficiencies in the degree of tightness of the sealing rings (grommets) at the cable entries and exits, allowing the entry of humidity and insects inside the box. In other solutions, the increase in the degree of tightness is obtained with high constructive complexity and undesirable production costs.

The known termination boxes have yet another drawback which results from the fact that they allow the lid to be closed even if the installer has not anchored the compact terminating cable (drop cable) correctly, allowing in this case the compact cable and consequently the data transmission network to be susceptible to undesirable movements and even unacceptable by the standards in force.

Examples of termination boxes of the type considered here can be found in U.S. Pat. Nos. 6,226,434, and 9,310,579.

In view of the above-mentioned drawbacks, a termination box and derivation box for the derivation of the type considered herein was proposed by the present applicant in their patent application BR 10 2018 005815-0, a termination and drop box for optical access networks, of aerial installation, presenting a relatively simple construction, with reduced number of parts, of easy and safe handling of the fiber splicing elements by the respective team of installers, without interference in the connection elements of terminal cables to be handled by another team of installers, this box also being equipped with a high degree of watertightness and double sealing system, acting on the distribution cables, the drop cables (continuation) and the terminal cables, and allowing the containment of large water jets in a first stage, as well as droplets and small insects in a second stage, with drainage between the two stages.

It happens that the said box, object of patent application BR 10 2018 005815-0, is designed to be assembled only in a horizontal position, with the cable entry and exit openings positioned on the opposite sides of a box base, on whose lower horizontal edge a lid is hinged. This former construction does not allow the box to be mounted in a vertical position.

Another particular aspect of the construction of the aforementioned anterior box of the same applicant concerns the large number of sealing elements in elastomer, of relatively complex and costly construction, to provide the tightness, individually and in double level, of the passage of each distribution or drop cable (continuation) through the respective lateral opening of the box and also a pair of sealing elements for the exit of the terminal cables ("drop") in each of the sides of the optical box.

SUMMARY OF THE INVENTION

Considering the aspects discussed above, the present invention has as its objective the provision of a termination and drop box for optical access networks, of aerial installation and presenting a simple, versatile construction at a substantially lower cost than similar boxes, with a reduced number of sealing elements for obtaining a desired degree of tightness and allowing its installation in the horizontal or vertical position on the cordage or wall of a building or even in the vertical position, also ensuring an easy and safe handling of fiber splice elements by the connecting elements of terminal cables to be handled by another team of installers, regardless of the installation position of the box.

Yet another object of the invention is to provide an aerial installation optical termination and drop box as mentioned above and which ensures the correct anchoring of the terminal cables ("drop" cables) when closing the lid.

The termination and drop box in question is of a type comprising: a base having a bottom wall and a leading edge defined by peripheral walls; a lid having a top wall and a trailing edge defined by peripheral walls and being movable between a closed position, seated and locked against the base, and an open position; and a tray hinged to the base and having a rear face carrying means for accommodating fiber extensions and fiber splicing and splitting means ("splitters"), and a front face carrying output adapters connected to fiber extensions and to respective connectors of a terminating cable, the tray being angularly displaceable between a first position, with its rear face seated against the base, and a second position with its rear face exposed to the installer.

According to the invention, a peripheral wall of the base, not hinged to the lid, is provided with a single lateral opening, defining a recessed extension of the anterior edge of the base and having its cross-section, not occupied by an optical cable, closed by an elastomer sealing bung and presenting a recessed anterior region.

The tray incorporates, on its front face and in a single piece, a lateral anchoring element, in the shape of a channel, having anterior edges provided with anchoring cutouts and posterior edges seated on the sealing bung, inside the recessed anterior region, when the tray is taken to the first seated position on the base, the lateral anchoring element receiving, on its anterior side, the fitting of a sealing element, in elastomer and provided with anterior slots aligned with the anchoring cutouts of the lateral anchoring element, each anterior slot and each pair of anchoring cutouts, aligned among themselves, receiving the tight fitting of an end cable and being a back edge extension of a peripheral lid wall, seated against the sealing element, in order to compress, the latter, around a respective end cable, said peripheral lid wall presenting another back edge extension, more internal and forcing said end cable into the confronting anchoring cutout, when closing the lid.

The construction summarized above is simple, versatile and low cost, and can be installed horizontally or vertically, ensuring easy and safe handling of the fiber splice elements by different teams of installers and ensuring the correct anchorage of the terminal cables (drop cables) when closing the lid.

BRIEF DESCRIPTION OF THE DRAWINGS

Below, the invention will be described on the basis of the attached drawings, given as an example of a embodiment of the invention and in which.

DESCRIPTION OF THE INVENTION

Figure 4:
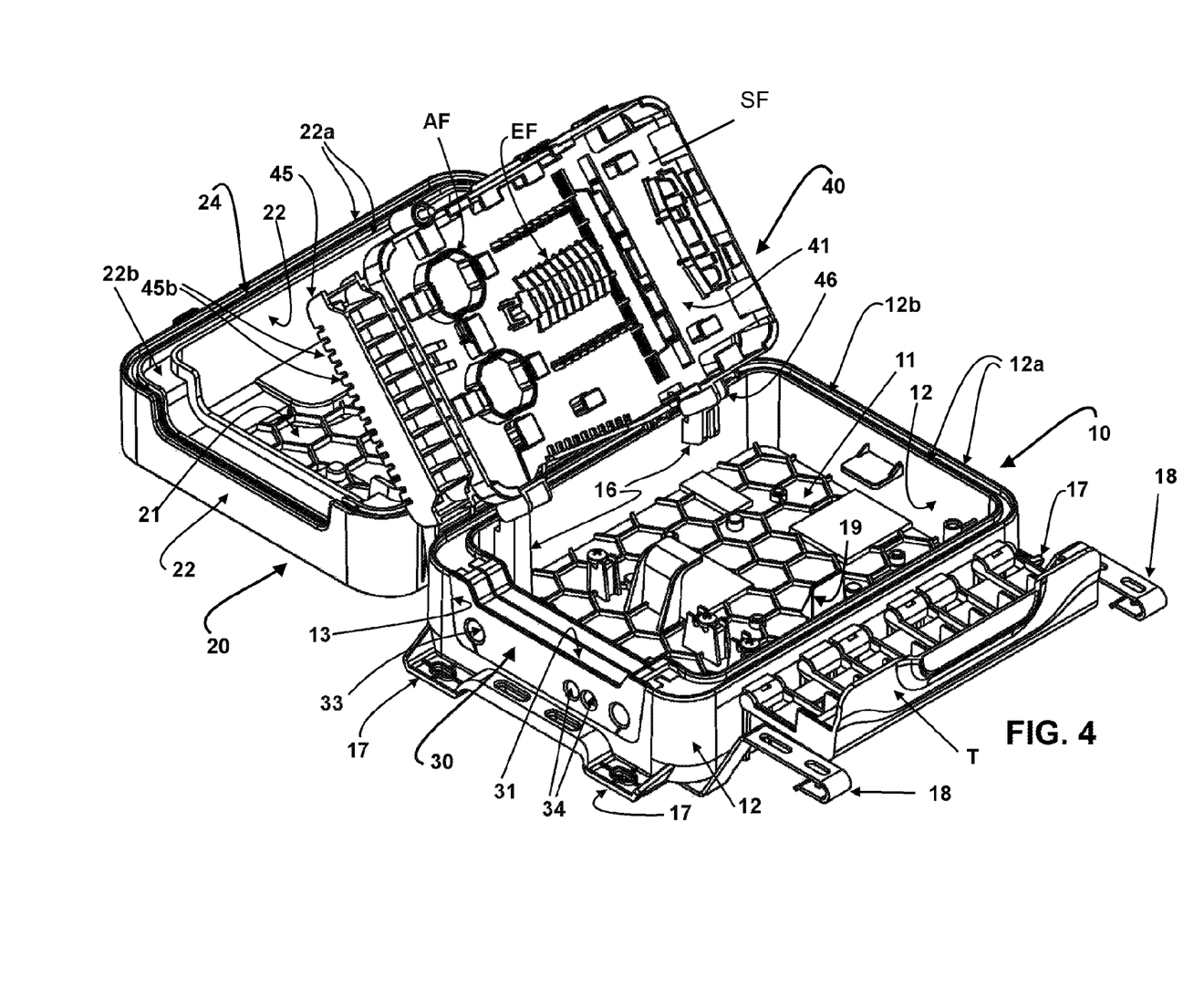
FIG. 4 represents a perspective view of the box of FIG. 3, with the lid in the open condition and the tray angled to a position in which it exposes, to the installer, its rear face carrying means of accommodating fiber extensions and fiber splice and splice units ("splitters") and a terminal cable.

As illustrated in the drawings and mentioned above, the optical termination and drop box in question comprises a base 10 and a lid 20 hinged to the base 10, both made of non-electrically conductive material, with the base 10 incorporating, in one piece, a back wall 11 (FIGS. 2, 4 and 5) and peripheral walls 12 and defining at least one anterior edge 12a, preferably multiple anterior edges 12a, which define, between themselves, a rail 12b. One of the peripheral walls 12, not hinged to the lid 20, is provided with a single lateral opening 13 (FIG. 5), defining a recessed extension of the anterior edge 12a of the base 10, for passage of multi-fiber optical cables CO, which may be defined by a multi-fiber distribution cable or by one or more multi-fiber drop cables.

The cross-section of the lateral opening 13, not occupied by a multifiber optical cable CO passing through said lateral opening 13, is closed by an elastomer sealing bung 30, fitted into said lateral opening 13 and featuring a recessed anterior region 31, the function of which will be described later.

Figure 8:
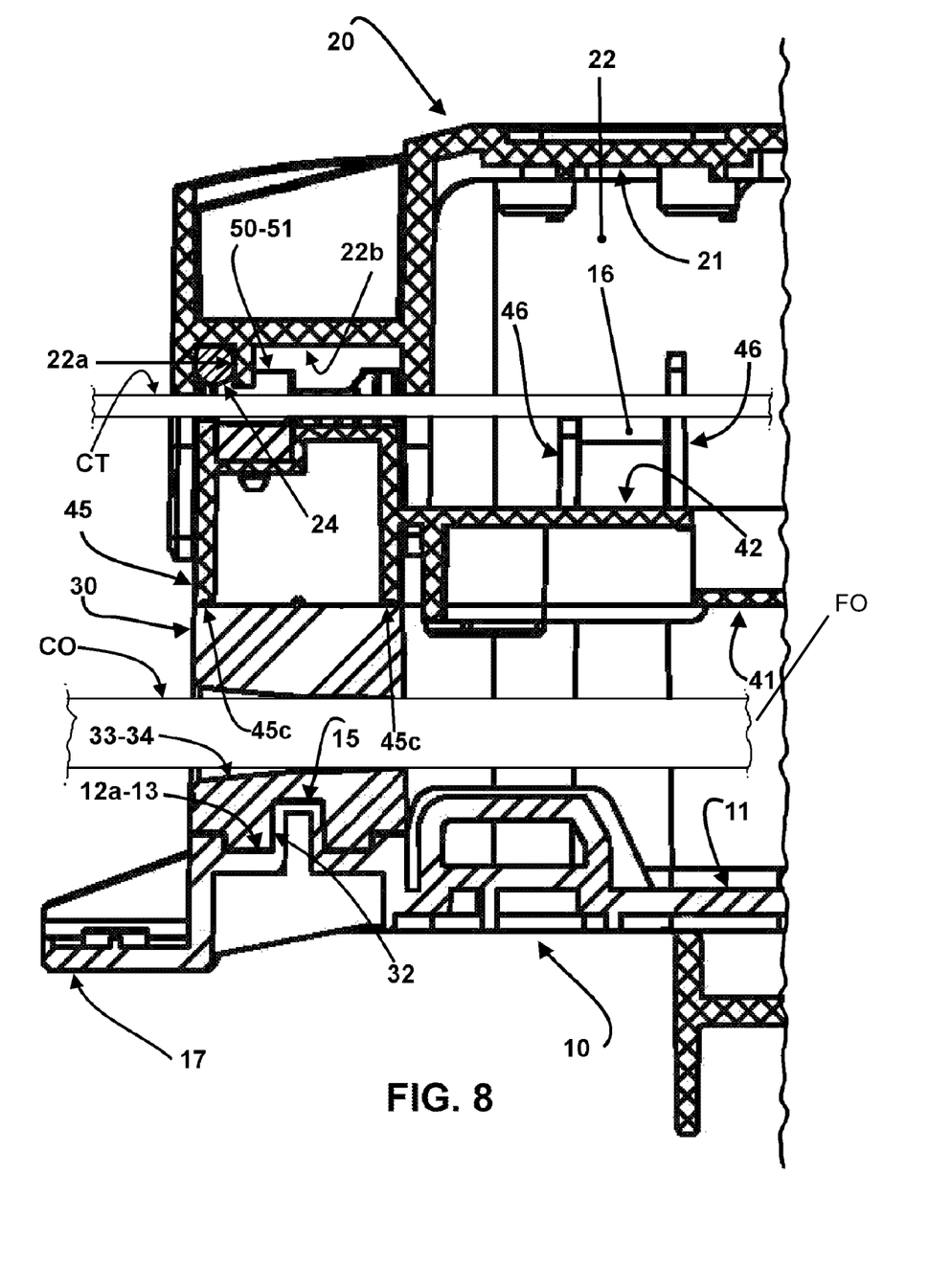
FIG. 8 represents a partial and extended longitudinal sectional view of the termination and drop box, in the closed condition and illustrating the sealing bung acting on a distribution or drop cable and further the anchoring element acting on a terminal cable.

According to the illustrated construction, the elastomer sealing bung 30 is medially and subsequently provided with a groove 32 (FIG. 8) into which a rib 15 is embedded, longitudinally and medially, along at least part of the recessed extension of the anterior edge 12a of the base 10, which defines the lateral opening 13. With this, the elastomer sealing bung 30 is solidly retained in the anterior edge 12a of the base 10.

Figure 7:
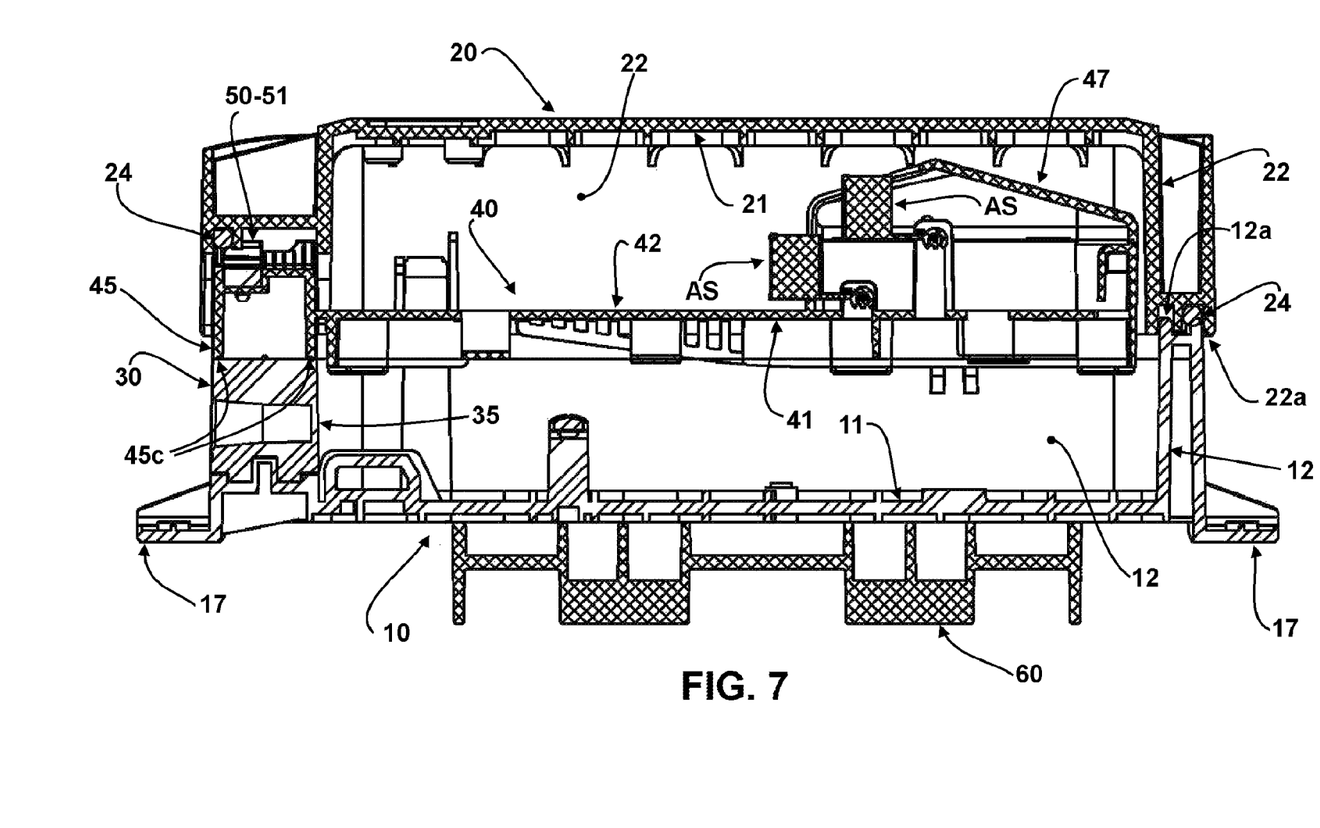
FIG. 7 represents a cross-sectional view of the termination box in the closed condition.

According to the invention, the elastomer sealing bung 30 is provided with transverse holes 33, 34 presenting one or more diametrical patterns, wherein the transverse holes 33, 34 of different patterns in the illustrated example, present one end closed by a respective breakable side wall portion 35 of the elastomer sealing bung 30 (FIG. 7). Thus, it is sufficient that said breakable side wall portion 35 be easily removed to allow a multi-fiber optical cable CO to pass through the respective transverse hole 33, 34 to enter or exit the box.

To ensure an adequate degree of tightness between the elastomer sealing bung 30 and each multi-fiber optical cable CO, passing through the elastomer sealing bung 30, each transverse hole 33, 34 has at least part of its length having a smaller diameter than the multi-fiber optical cable CO.

The lid 20 has a top wall 21 and peripheral walls 22 defining at least one and preferably multiple back edge extensions 22a, which define between them, a lid rail 22b, the lid 20 being hinged to the base 10, preferably on a peripheral wall 12 of the latter, devoid of the lateral opening 13, to be movable between an open position (FIGS. 3 and 4), with its back edge extension 22a away from the anterior edge 12a of the base 10, to allow access to the interior of the box by the operator/installer of the fiber optic network, and a closed position (FIGS. 1, 2, 7 and 8), locked to the base 10 and in which the anterior edges 12a and back edge extensions 22a, of the base 10 and the lid 20, in the region devoid of the lateral opening 13, are seated together and preferably fitted together forming a sealing labyrinth.

In the illustrated construction, the back edge extension 22a of the lid 20 presents the form of a small channel into the interior of which a sealing gasket 24 (FIGS. 3, 4, 7 and 8), in the form of a bead of elastomer material, provides tightness in the seating region between the base 10 and the lid 20.

The optical termination box further comprises a tray 40 having an edge hinged to the base 10 and presenting a rear face 41 and a front face 42, the tray 40 being angularly movable between a first position, with its rear face 41 seated on the base 10 above the lateral opening 13 and exposing the front face 42 to the multi-fiber optical cable CO installer, and a second position in which it exposes the rear face 41 to the terminal cable CT installer.

The tray 40 incorporates, on its front face 42 and in one piece, a channel-shaped lateral anchoring element 45 having anterior edges 45a provided with anchoring cutouts 45b and posterior edges 45c seated on the elastomer sealing bung 30 inside the recessed anterior region 31 of the latter when the tray 40 is brought to the first position seated on the base 10. The lateral anchoring element 45 is fitted with an elastomer sealing element 50 and provided with anterior slots 51 aligned with the anchoring cutouts 45b of the lateral anchoring element 45. The anterior slots 51 extend from a side face of the elastomer sealing element 50, facing out of the box, to an opposite, breakable side wall 52 which closes the adjacent end of the set of anterior slots 51. Upon engagement of a terminal cable CT in one of said anterior slots 51, the respective portion of the opposite, breakable side wall 52 is broken off and removed. This arrangement ensures that the unused previous slots are sealed.

With the above construction, each anterior slot 51 of the elastomer sealing element 50 and each pair of anchoring cutouts 45b, aligned with each other receives the tight fit of a terminal cable CT, promoting adequate axial retention of the latter and further adequate tightness between each terminal cable CT in the elastomer sealing element 50.

In the illustrated construction, a back edge extension 22a of a peripheral wall 22 of the lid 20 is seated against the elastomer sealing element 50, compressing the latter around a respective terminal cable CT, wherein the peripheral wall 22 of the lid 20 presents yet another back edge extension 22a, further inward and forcing said terminal cable CT into the confronting anchoring cutout 45b upon closure of the lid 20. This construction ensures the correct anchoring of the terminal cables CT upon closure of the lid 20.

The tray 40 incorporates, on its rear face 41, fiber extension accommodation means AF, fiber splicing means EF, a fiber splitting element ("splitter") SF, and connectors C receiving optical fibers FO split from a fiber derived from a multi-fiber optical cable CO. The front face 42 of the tray 40 carries angularly scalable output adapters AS to each receive the fit of a respective connector C of a terminal cable CT.

With the provision of a single tray 40 hinged to the base 10, it is possible for an installation crew to perform fusion splicing and further splitting of an optical fiber FO using the rear face 41 of the tray 40 which may define a kind of horizontal table, when mounting the box on a string or building, with the hinge of the lid 20 arranged horizontally. However, when mounting the box with the articulation axis of the lid 20 in a vertical position, the rear face 41 of the tray 40 remains in a vertical plane when the tray 40 is moved to its second position illustrated in FIG. 4. In this case, the optical splicing or splitting team can simply move the tray 40 to its second position and work on the rear face 41 without risk of producing damage to the connections of the terminal cables CT arranged on the front face 42 of the tray 40.

To facilitate working on the rear face 41 of the tray 40 when the box is installed vertically, the base 10 incorporates, in the region of its peripheral wall 12 of lid 20, a pair of coupling means 16 (FIGS. 4, 5 and 8) in which are hinged, removably by elastic deformation, a corresponding pair of articulation tabs 46 (FIGS. 5A and 6) incorporated in an edge of the tray 40 adjacent to the articulation axis of the lid 20. This enables the operator/installer to detach the tray 40 from the base 10 in order to work on either side of the tray 40 on a work platform mounted, in an elevated manner, adjacent to a string, a building wall or even a pole. This feature is particularly useful when the box is mounted vertically.

As illustrated in FIGS. 1, 2 3, and 4, the back wall 11 of the base 10 is usually arranged in a vertical mounting plane to remain mounted to a ropeway (not illustrated) by means of suspension hooks 18, removably attached to the base 10 and which can take different constructions, such as that illustrated exemplarily.

However, the suspension hooks 18 may be suppressed when the box has the outer face of the back wall 11 of the base 10 fixed, directly against a building wall, with a hinge axis vertically or horizontally, by means, for example, of screws (not illustrated) passing through side tabs 17 incorporated laterally and externally into the base 10, or against a pole with the hinge axis of the lid 20 disposed vertically.

Figure 1:
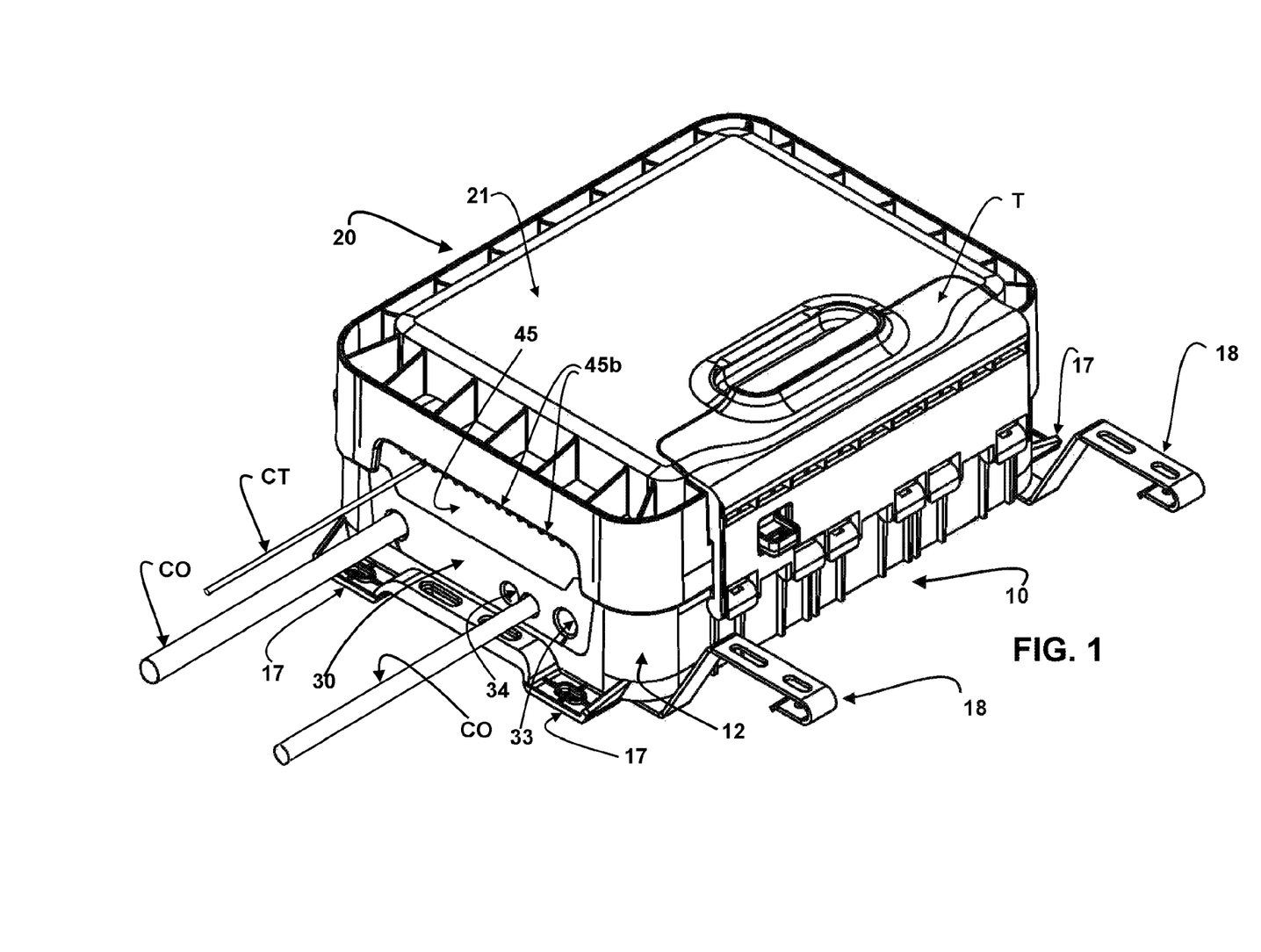
FIG. 1 represents a perspective view of the termination and drop box of the invention, with its lid in a closed condition over the base and with the lateral opening of the latter housing a sealing bung provided with two pairs of transverse holes for fair and sealed passage of a corresponding distribution or drop cable.
Figure 2:
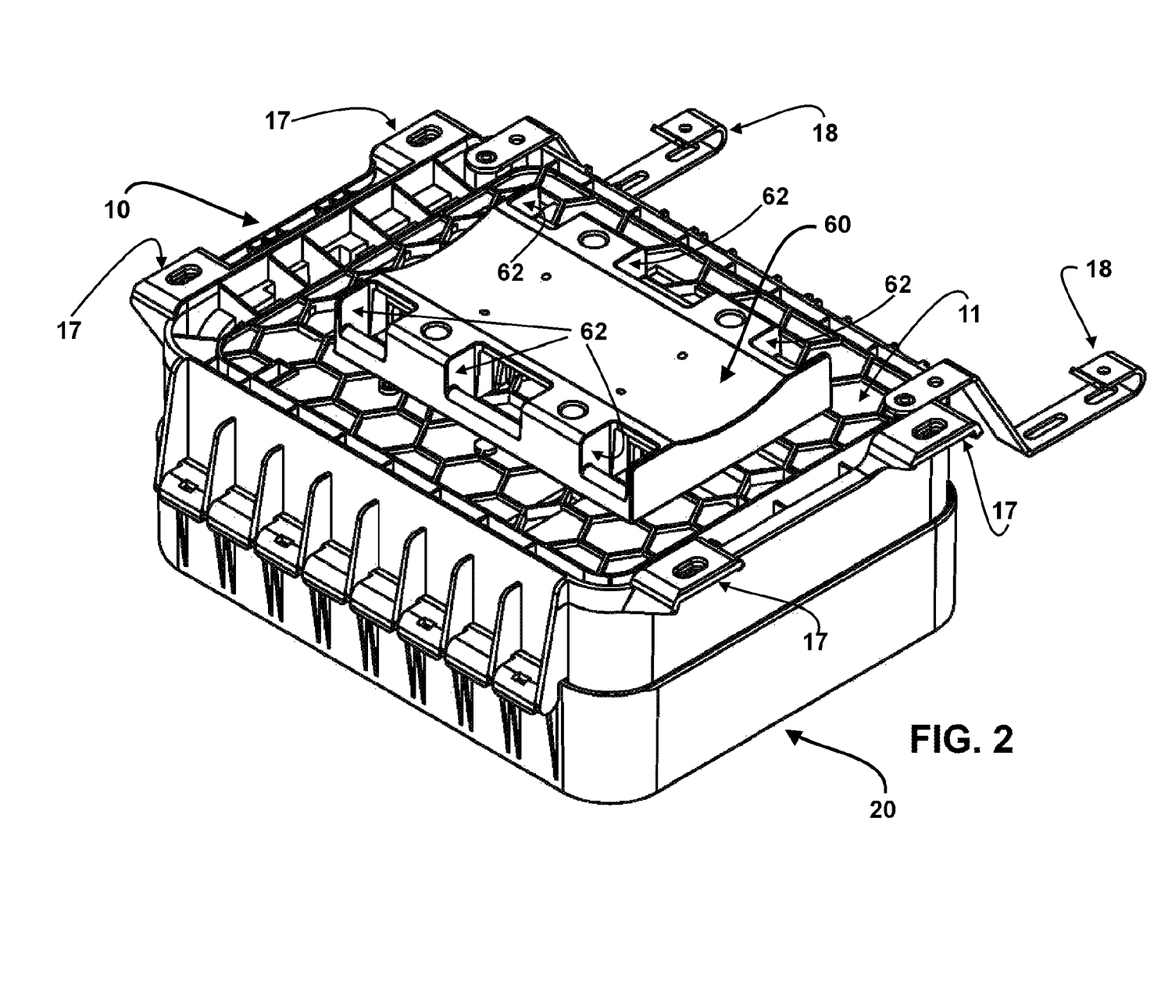
FIG. 2 represents a perspective view of the box of FIG. 1, when viewed from the bottom side of the base which is provided with a concave cradle for fixing the box in the vertical position on a pole.
Figure 3:
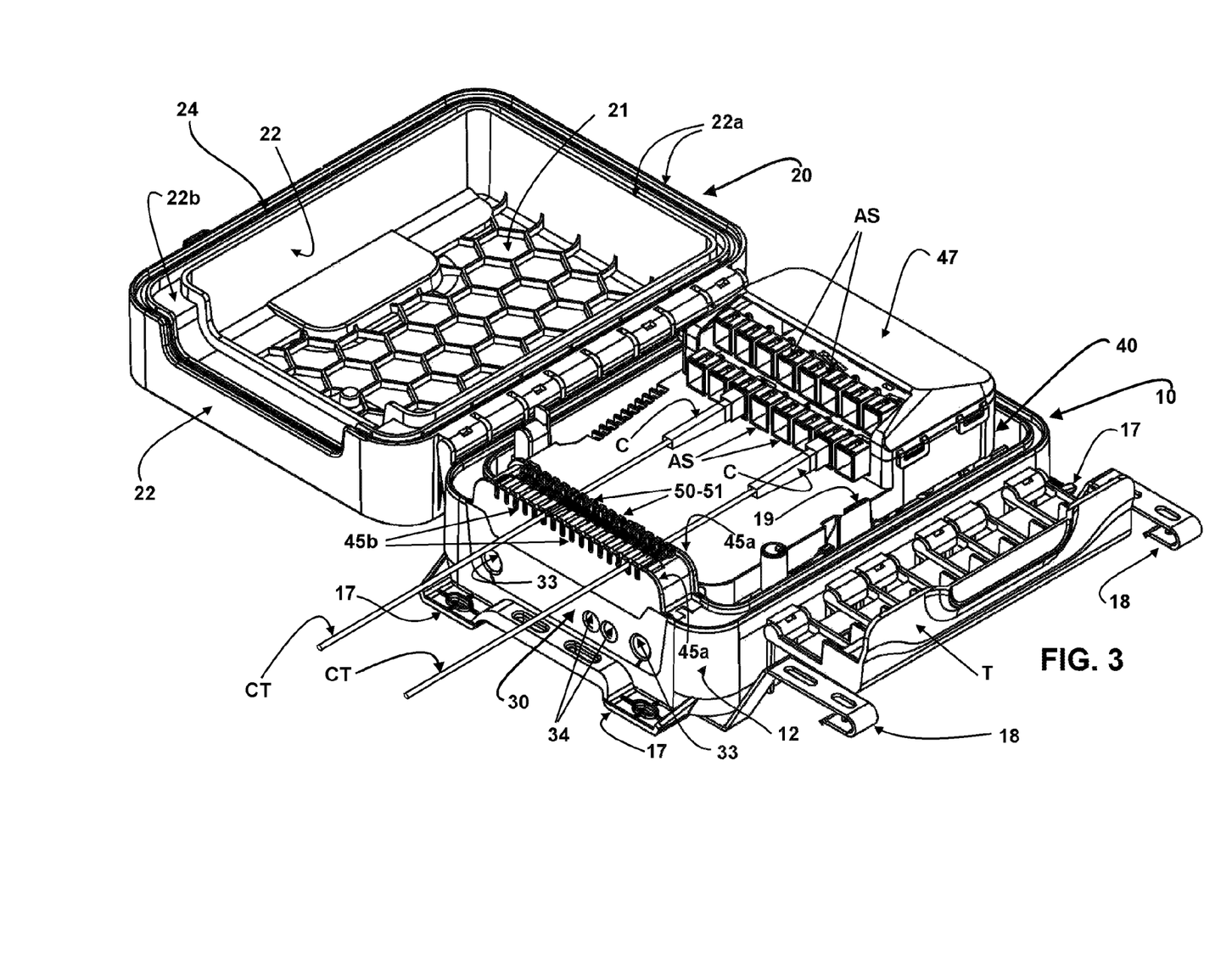
FIG. 3 represents a perspective view of the box of FIGS. 1 and 2 in a horizontal mounting condition, for example on a string, with the lid in the open condition and the tray seated on the base and having its front face carrying, on a side opposite to that of the lateral opening of the base, two overlapping sets of eight angularly retractable adapters, for connecting terminal cables (drop cables)

When mounting the box on a pole, a concave cradle 60 illustrated in FIGS. 2, 7 is provided and is externally and removably attached to the back wall 11, of the base 10, by screws 61, attachable in watertight housings provided in said back wall 11, or by other suitable removable attachment means, said concave cradle 60 provided with pairs of side openings 62, opposed two by two, for the passage of straps (not shown) for tying the box to a pole.

Particularly when mounting the box with the hinge of the lid 20 horizontal, the tray 40 can be stabilized in its second position by partially seating it against a peripheral wall 22 of the lid 20, adjacent to its articulation to the base 10, the lid 20 being in an open position coplanar to and pendent from the base 10.

Figure 5:
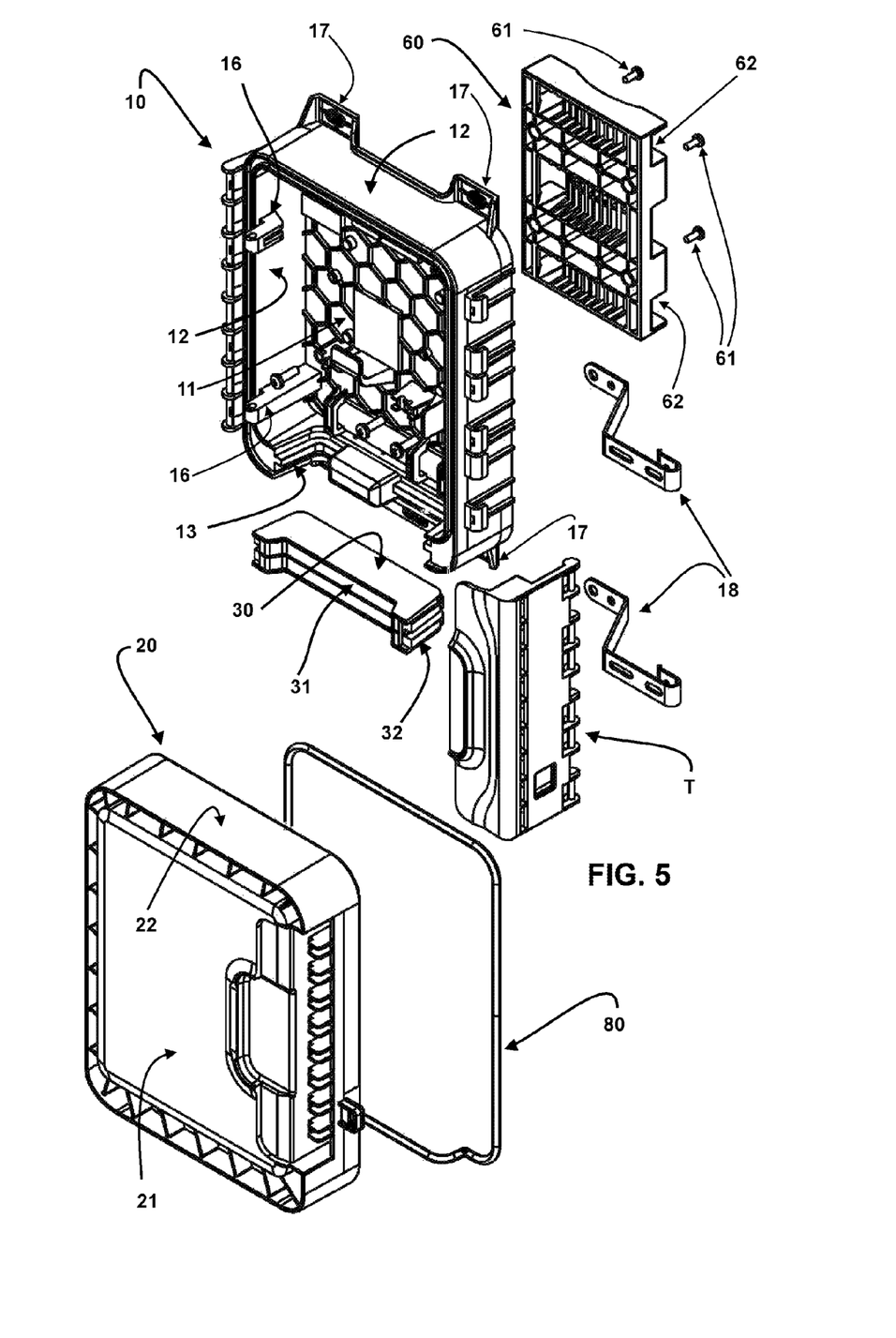
FIG. 5 represents an exploded perspective view of a first group of the termination and drop box components, associated with the base and lid.
Figure 5A:
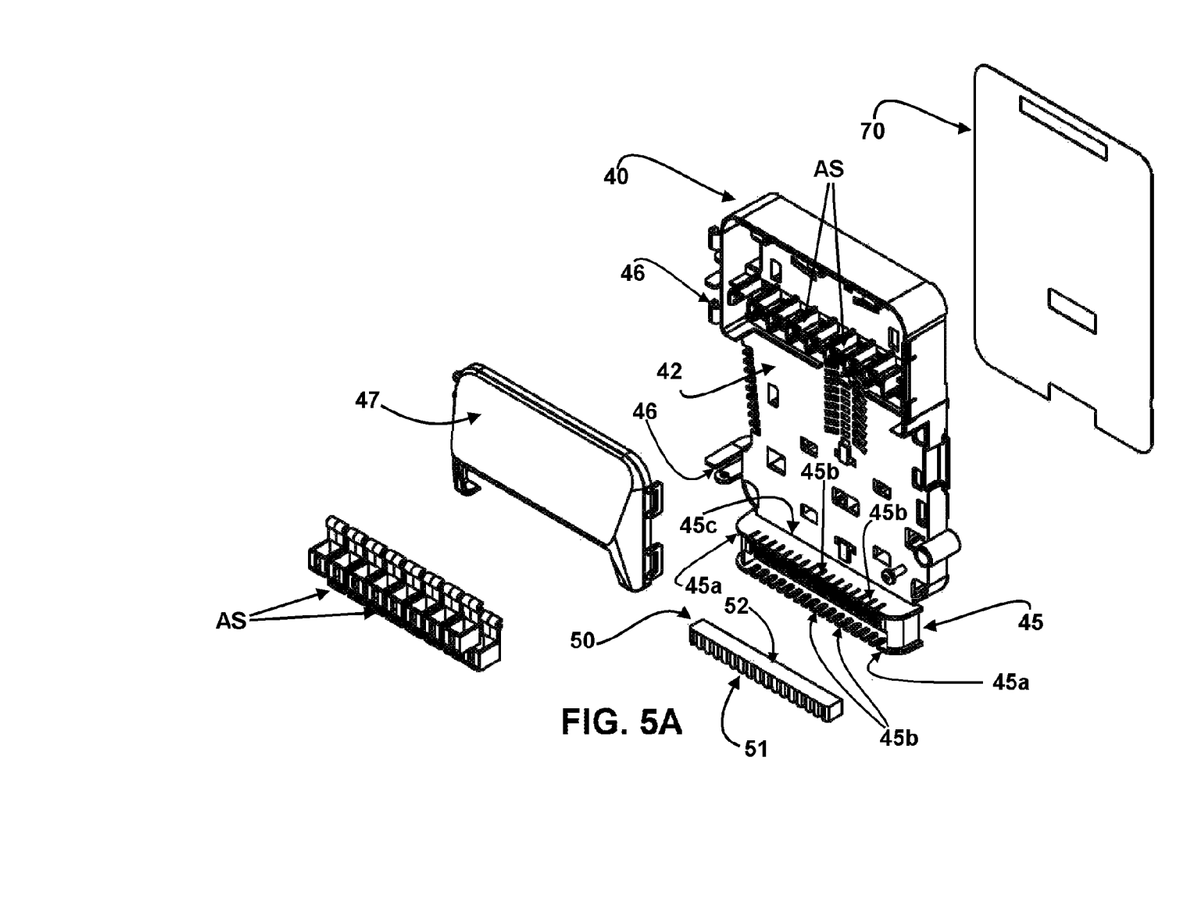
FIG. 5A represents an exploded perspective view of a second group of the termination and drop box components, associated with the tray.
Figure 6:
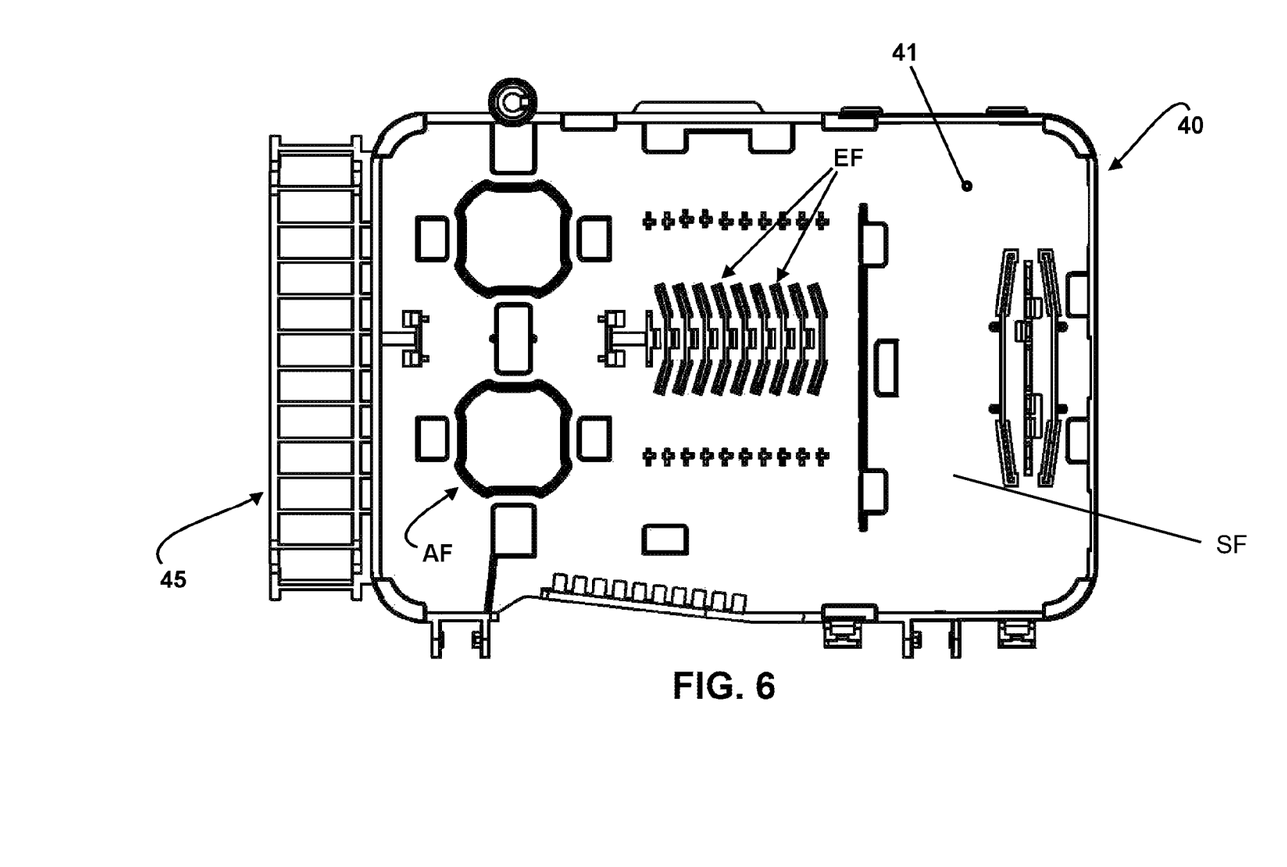
FIG. 6 represents a plan view of the rear face of the tray.

In the illustrated exemplary configuration, the tray 40 has its rear face 41 covered by a film 70, in flexible polymeric material, for protecting the optical fiber fusions, and on the front face 42 of the tray 40 is mounted a complementary lid 47 partially covering the angularly scalable output adapters AS and a reserve region of optical fiber extensions derived from the fiber splitting element ("pig tails") and connected to the angularly scalable output adapters AS. Between the front face 42 of the tray 40 and the lid 20 is provided a sealing tape 80, in elastomer, flexible or not, for protecting the connections of the terminal cable CT connectors to the respective angularly scalable output adapters AS, as illustrated in FIG. 5.

In the illustrated construction, the base 10 incorporates, internally, a locking tab 19, elastically deformable from an operative position, in which it locks the tray 40 in its first position seated on the base 10, to an inoperative position, in which it releases the angular displacement of the tray 40 from its first position to its second position.

In a particular construction of the invention, the lid 20 is locked to the base 10 by a T-lock carried by a peripheral wall 12 of the base 10, opposite to that hinging the lid 20 to the base 10 and moveable between an open position and a closed position, in which it latches, to each other, confronting peripheral walls 12 of the base 10 and the lid 20. It is to be understood that the T-lock may also be mounted via hinge to a peripheral wall 22 of the lid 20, to act against the base 10 when closing the optical termination box.

Although only one configuration of the optical termination and drop box in question has been illustrated here, it is to be understood that changes may be made in the shape and arrangement of the components, without departing from the constructive concept defined in the claims accompanying this report.

The invention claimed is:

1. An optical termination and drop box, comprising:
   a base (10) having a back wall (11) and an anterior edge (12a) defined by peripheral walls (12);
   a lid (20) having a top wall (21) and a back edge extension (22a) defined by peripheral walls (22) and being movable between a closed position, seated and locked against the base (10), and an open position; and
   a tray (40) hinged to the base (10) and having a rear face (41) for accommodating fiber extensions (AF) and fiber splicing (EF) and splitting (SF) means and a front face (42) carrying output adapters (AS) for receiving connectors (C) connected to fiber splicing means (EF) of respective terminal cables (CT), the tray (40) being angularly displaceable between a first position, with the rear face (41) of the tray (40) seated on the base (10), and a second position with the rear face (41) exposed, the box including:
   a peripheral wall (12) of the base (10) not articulated to the lid (20), the peripheral wall (12) provided with a single lateral opening (13), defining a lowered extension of the anterior edge (12a) of the base (10), the single lateral opening (13) having a cross section, which is not occupied by an optical cable (CO), closed by an elastomer sealing bung (30) having a recessed anterior region (31),
   the tray (40) having a one piece lateral anchoring element (45) on the front face (42), the lateral anchoring element (45) having anterior edges (45a) provided with anchoring cutouts (45b) and posterior edges (45c) seated on the elastomer sealing bung (30) inside the recessed anterior region (31),
   wherein when the tray (40) is in the first position on the base (10), the lateral anchoring element (45) receives an elastomer sealing element (50), provided with anterior slots (51) aligned with the anchoring cutouts (45b) of the lateral anchoring element (45), each anterior slot (51) aligned with a pair of anchoring cutouts (45b) to receive a terminal cable (CT),
   one of the back edge extensions (22a) of the lid (20) is seated against the elastomer sealing element (50) and compresses the elastomer sealing element (50) around the terminal cables (CT),
   another back edge extension (22a), which is internal to the one of the back edge extensions (22a), forces the terminal cable (CT) into the anchoring cutout (45b) when closing the lid (20).

2. The box, according to claim 1, characterized in that the elastomer sealing bung (30) is medially provided with a groove (32) into which a rib (15) is inserted, wherein the rib (15) is located in the lowered extension of the anterior edge (12a) of the base (10), which defines the lateral opening (13).

3. The box, according to claim 2, characterized in that the elastomer sealing bung (30) is provided with transverse holes (33, 34) having one end closed by a respective portion of a breakable side wall (35) of the elastomer sealing bung (30).

4. The box according to claim 2, characterized in that each transverse hole (33, 34) of the elastomer sealing bung (30) has a diameter smaller than that of the multi-fiber optical cable (CO) to be passed through each transverse hole (33, 34) along at least part of the length of each transverse hole (33, 34).

5. The box, according to claim 1, characterized in that the anterior slots (51) of the elastomer sealing element (50) extend from a side wall (52) of the elastomer sealing element (50) to an opposed side wall of the elastomer sealing element (50), the opposed side wall facing towards an outside of the box.

6. The box, according to claim 1, characterized in that the base (10) includes a pair of coupling means (16) removably connected to a corresponding pair of articulation tabs (46) by elastic deformation, the pair of articulation tabs (46) incorporated in an edge of the tray (40), adjacent to the axis around which the lid (20) pivots.

7. The box according to claim 1, characterized in that the box is mounted on a string with a pivot axis of the lid (20) oriented horizontally, by means of a pair of suspension hooks (18), which are removably attached to the base (10).

8. The box, according to claim 1, characterized in that the box further comprises a concave cradle (60) externally and removably attached to the back wall (11) of the base (10) and provided with pairs of side openings (62), which are opposed two by two, for the passage of straps for tying the box to a pole.

9. The box, according to claim 1, characterized in that the rear face (41) of the tray (40) is covered by a flexible, polymeric film (70), protecting optical fiber fusions, and a complementary lid (47) is mounted on the front face (42) of the tray (40) the complementary lid (47) partially covering the output adapters (AS) and a reserve region of optical fiber extensions derived from the fiber splitting means (SF) and connected to the output adapters (AS).

10. The box, according to claim 1, characterized in that the box is provided with a sealing tape (80) arranged between the front face (42) of the tray (40) and the lid (20), the lid (20) covering the connections of the terminal cables (CT) to the respective output adapters (AS).

11. The box, according to claim 1, characterized in that the base (10) internally includes an elastically deformable locking tab (19), having an operative position that locks the tray (40) in the first position seated on the base (10) and an inoperative position that allows angular displacement of the tray (40) from the first position to the second position.

12. The box, according to claim 1, characterized in that the box is provided with a latch (T) carried by a peripheral wall (12) opposed to a pair of coupling means (16) of the base (10), the latch (T) movable between an open position and a closed position latching confronting peripheral walls (12, 22) of the base (10) and the lid (20).

\* \* \* \* \*